(12) United States Patent
Oh et al.

(10) Patent No.: US 10,539,790 B2
(45) Date of Patent: Jan. 21, 2020

(54) COORDINATE MATCHING APPARATUS FOR HEAD-UP DISPLAY

(71) Applicant: Hyundai Autron Co., Ltd., Seongnam-si (KR)

(72) Inventors: Hyung Suk Oh, Yongin-si (KR); Byung Jik Keum, Seoul (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 227 days.

(21) Appl. No.: 15/360,687

(22) Filed: Nov. 23, 2016

(65) Prior Publication Data
US 2017/0146799 A1 May 25, 2017

(30) Foreign Application Priority Data
Nov. 24, 2015 (KR) .......................... 10-2015-0164758

(51) Int. Cl.
*G09G 5/00* (2006.01)
*G02B 27/01* (2006.01)
*B60R 1/00* (2006.01)
*G06T 19/00* (2011.01)

(52) U.S. Cl.
CPC ............ *G02B 27/0101* (2013.01); *B60R 1/00* (2013.01); *G06T 19/006* (2013.01); *B60R 2300/205* (2013.01); *B60R 2300/301* (2013.01); *B60R 2300/8086* (2013.01); *G02B 2027/0138* (2013.01); *G02B 2027/0141* (2013.01); *G06T 2200/04* (2013.01)

(58) Field of Classification Search
CPC ................ B60R 1/00; B60R 2300/205; B60R 2300/301; B60R 2300/8086; G02B 2027/0138; G02B 2027/014; G02B 2027/0141; G02B 27/0101; G06T 19/006; G06T 2200/04
See application file for complete search history.

(56) References Cited

U.S. PATENT DOCUMENTS

| | | | |
|---|---|---|---|
| 2010/0066832 A1* | 3/2010 | Nagahara ............. | G02B 7/1822 348/148 |
| 2011/0298693 A1 | 12/2011 | Tasaki et al. | |
| 2014/0168265 A1* | 6/2014 | Ahn ......................... | B60R 1/00 345/633 |

FOREIGN PATENT DOCUMENTS

| CN | 101166247 A | 4/2008 |
|---|---|---|
| CN | 101876752 A | 11/2010 |
| CN | 201837782 U | 5/2011 |
| CN | 105044910 A | 11/2015 |
| JP | 2009-250827 A | 10/2009 |
| JP | 2014-75079 A | 4/2014 |
| KR | 10-2005-0010429 A | 1/2005 |

(Continued)

*Primary Examiner* — Insa Sadio
(74) *Attorney, Agent, or Firm* — Morgan, Lewis & Bockius LLP

(57) ABSTRACT

A coordinate matching apparatus for HUD (Head-Up Display) may include: an HUD configured to display an image on the windshield of a vehicle; a surrounding information measuring unit installed on the vehicle and configured to sense an object in front of the vehicle; and a control unit configured to match a coordinate of the surrounding information measuring unit corresponding to an installation position with a coordinate of the HUD, and display the image by matching the position of the object sensed by the surrounding information measuring unit with the coordinate of the HUD.

6 Claims, 4 Drawing Sheets

(56) References Cited

FOREIGN PATENT DOCUMENTS

| KR | 10-2015-0055181 A | 5/2015 |
| KR | 10-2015-0055184 A | 5/2015 |

\* cited by examiner

COORDINATE MATCHING APPARATUS FOR HEAD-UP DISPLAY

CROSS-REFERENCES TO RELATED APPLICATIONS

The present application claims priority to Korean application number 10-2015-0164758, filed on Nov. 24, 2015, which is incorporated by reference in its entirety.

BACKGROUND OF THE INVENTION

The present invention relates to a coordinate matching apparatus and method for HUD (Head-Up Display), and more particularly, to a coordinate matching apparatus and method for HUD, which not only matches a coordinate of a surrounding information measuring device with a coordinate of the HUD but also converts the position of an object such that view angles are matched, in order to display information measured by the surrounding information measuring device.

Recently, most vehicles have a navigation system to provide a destination and road guide to a driver. Furthermore, vehicles having an HUD mounted therein have also been on the market, the HUD projecting desired information onto the windshield of a vehicle and enabling a driver to acquire the projected information while the driver keeps eyes forward.

Moreover, research is being conducted on a method for displaying specific information in the form of AR (Augmented Reality) through HUD.

The AR indicates a technique for turning the environment around a user into a digital interface by placing 3D virtual objects in the real world seen by the user. Since the AR mixes a virtual world having additional information with the real world in real time and displays the mixed world as one image, the AR is also referred to as MR (Mixed Reality).

However, such an HUD simply displays navigation information and simple information on vehicle operation.

The related art of the present invention is disclosed in Korean Patent Publication No. 2005-0010429 published on Jan. 27, 2005 and entitled "Positioning device for head up display image".

When the surrounding information of a vehicle is measured and displayed in the form of AR on the HUD, the size of an object may different from an actual object or the position of the object may deviate from the position of the actual object, in case where the coordinate and view angle of the surrounding information measuring device are different from the coordinate and view angle of a video displayed through the HUD.

SUMMARY OF THE INVENTION

Various embodiments of the present invention are directed to a coordinate matching apparatus and method for HUD, which not only matches a coordinate of a surrounding information measuring device with a coordinate of the HUD but also converts the position of an object such that view angles are matched, in order to display information measured by the surrounding information measuring device.

In one embodiment, a coordinate matching apparatus for HUD may include: an HUD configured to display an image on the windshield of a vehicle; a surrounding information measuring unit installed on the vehicle and configured to sense an object in front of the vehicle; and a control unit configured to match a coordinate of the surrounding information measuring unit corresponding to an installation position with a coordinate of the HUD, and display the image by matching the position of the object sensed by the surrounding information measuring unit with the coordinate of the HUD.

The coordinate matching apparatus may further include a vehicle posture measuring unit configured to measure vibration and posture of the vehicle. The control unit may correct the coordinate of the HUD for a coordinate change based on the posture of the vehicle.

The vehicle posture measuring unit may include one or more of a vibration sensor, acceleration sensor and gyro sensor.

The surrounding information measuring unit may include one or more of a camera, radar and LiDAR (Light Detection And Ranging).

The control unit may convert the position of the object sensed by the surrounding information measuring unit such that a view angle measured by the surrounding information measuring unit coincides with a view angle of the image displayed through the HUD.

The control unit may match the position of the object sensed through the surrounding information measuring unit with the coordinate of the HUD through a viewpoint conversion matrix for matching the coordinate of the surrounding information measuring unit corresponding to the installation position with the coordinate of the HUD.

In another embodiment, a coordinate matching method for HUD may include: receiving, by a control unit, an image of an object sensed by a surrounding information measuring unit; matching a coordinate of the surrounding information measuring unit corresponding to an installation position with a coordinate of the HUD, and displaying a HUD image by matching the position of the object with the coordinate of the HUD.

The matching of the coordinate of the surrounding information measuring unit with the coordinate of the HUD may include correcting the coordinate of the HUD when a coordinate change corresponding to a vehicle posture is received from a vehicle posture measuring unit.

The vehicle posture measuring unit may include one or more of a vibration sensor, acceleration sensor and gyro sensor.

The coordinate matching method may further include converting the position of the object sensed by the surrounding information measuring unit such that a view angle measured by the surrounding information measuring unit coincides with a view angle of the image displayed through the HUD.

The displaying of the HUD image may include matching the position of the object sensed through the surrounding information measuring unit with the coordinate of the HUD through a viewpoint conversion matrix for matching the coordinate of the surrounding information measuring unit corresponding to the installation position with the coordinate of the HUD.

The surrounding information measuring unit may include one or more of a camera, radar and LiDAR.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
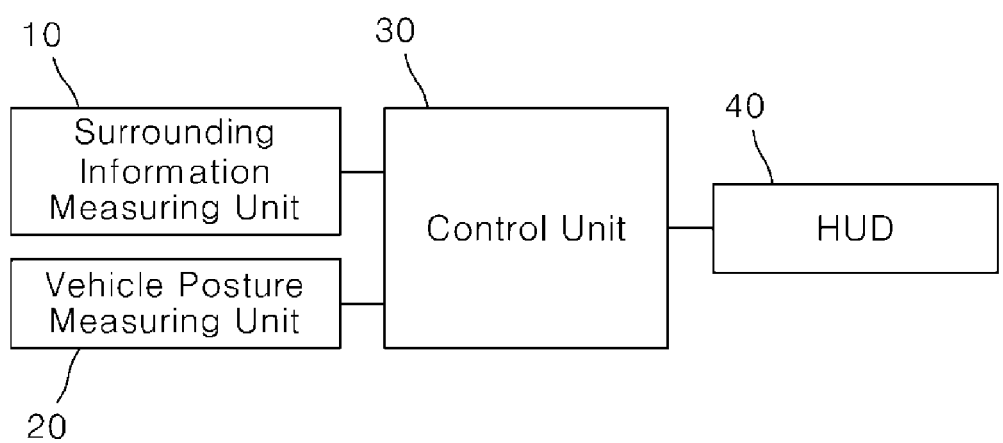
FIG. 1 is a block configuration diagram illustrating a coordinate matching apparatus for HUD in accordance with an embodiment of the present invention.
Figure 2:
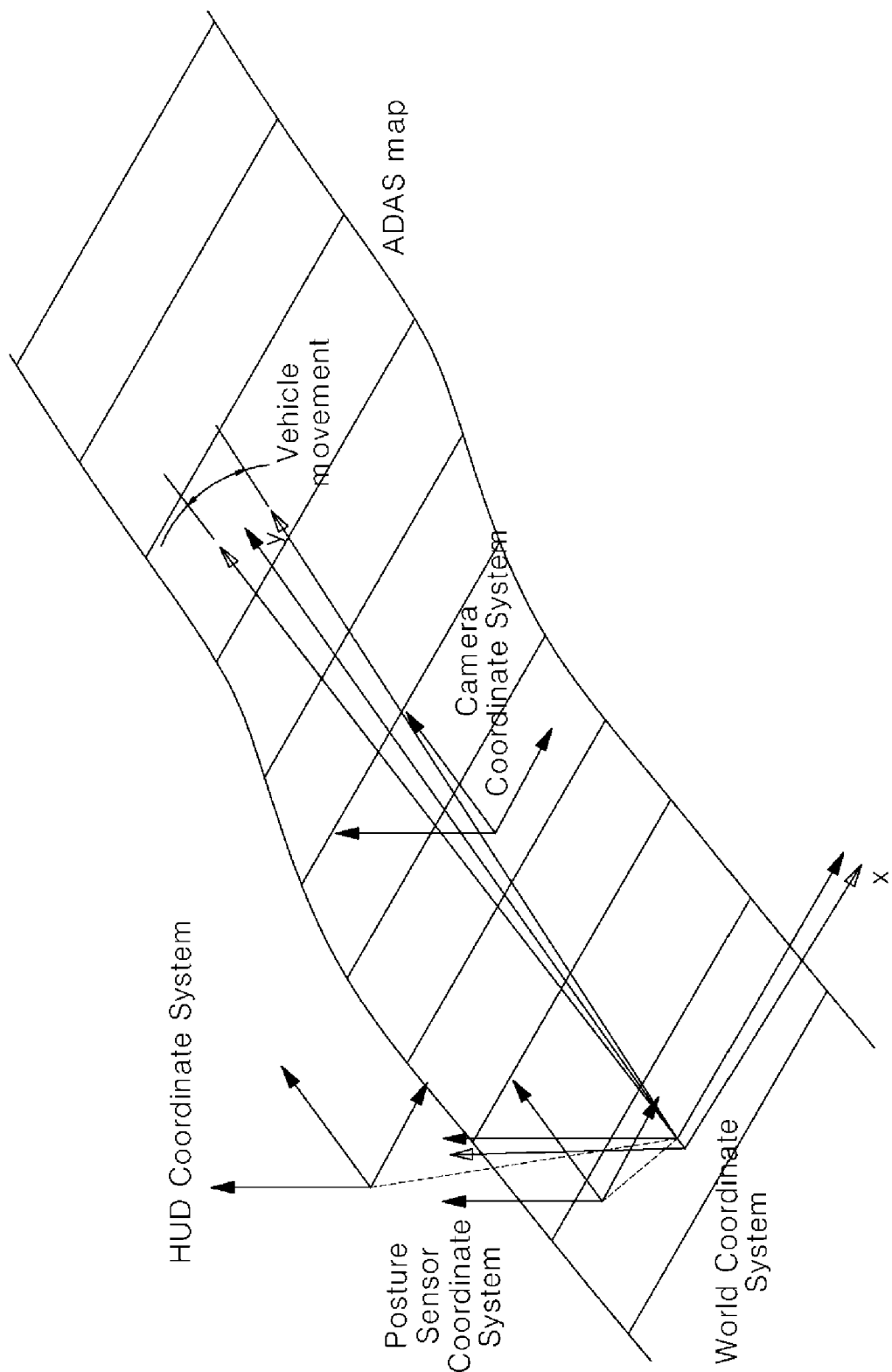
FIG. 2 is a diagram illustrating various coordinate systems in the coordinate matching apparatus for HUD in accordance with the embodiment of the present invention.
Figure 3A:
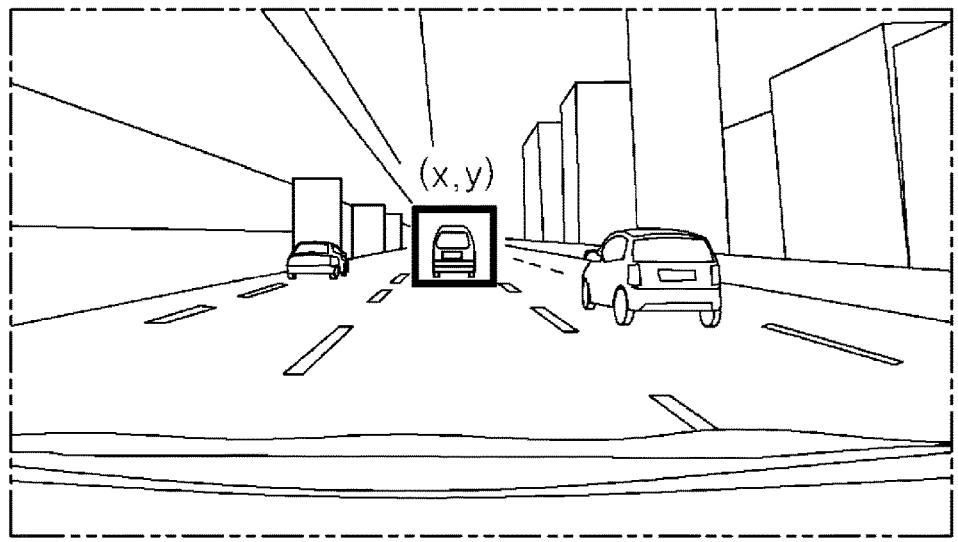
FIGS. 3A, 3B, and 3C are images illustrating a viewpoint conversion process in the coordinate matching apparatus for HUD in accordance with the embodiment of the present invention.
Figure 3B:
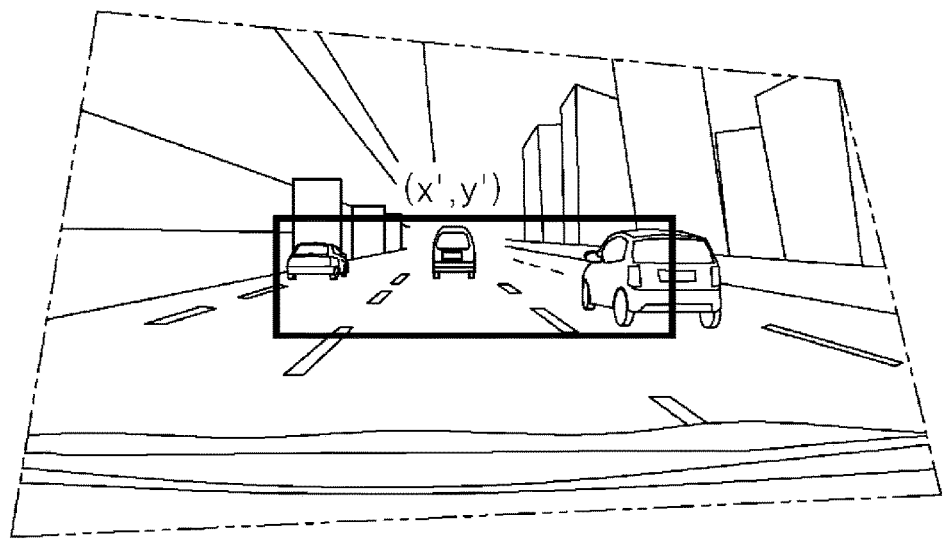
Figure 3C:

FIG. 1 is a block configuration diagram illustrating a coordinate matching apparatus for HUD in accordance with an embodiment of the present invention, FIG. 2 is a diagram illustrating various coordinate systems in the coordinate matching apparatus for HUD in accordance with the embodiment of the present invention, and FIGS. 3A to 3C are images illustrating a viewpoint conversion process in the coordinate matching apparatus for HUD in accordance with the embodiment of the present invention.

As illustrated in FIG. 1, the coordinate matching apparatus in accordance with the embodiment of the present invention includes an HUD 40, a surrounding information measuring unit 10, a control unit 30 and a vehicle posture measuring unit 20.

The HUD 40 projects and displays an image on the windshield of a vehicle (not illustrated).

The surrounding information measuring unit 10 is installed on the vehicle, senses a forward object, and provides an image of the sensed object.

The surrounding information measuring unit 10 may include one or more of a camera, radar and LiDAR (Light Detection And Ranging).

The surrounding information measuring units 10 may be installed at various positions of the vehicle, in order to sense an object by taking an image of the front of the vehicle. Thus, when the image taken by the surrounding information unit 10 are displayed on the HUD 40, the position and size of the object may appear to be distorted from those of the actual object in case where a coordinate measured by the surrounding information measuring unit 10 and the coordinate of the HUD 40 are not matched with each other.

In order to prevent such a distortion, the control unit 30 matches the coordinate of the surrounding information measuring unit 10 corresponding to the installation position thereof with the coordinate of the HUD 40.

For example, a camera serving as the surrounding information measuring unit 10 may be installed at the front bottom of the vehicle so as to sense a forward object. In this case, since the HUD 40 displays an image on the windshield from the center of the vehicle, even the position of the same object may differ when seen from the respective coordinate systems. Thus, the control unit 30 matches the coordinates with each other such that the corresponding object can be displayed at the same coordinate.

The vehicle posture measuring unit 20 includes one or more of a vibration sensor, acceleration sensor and gyro sensor, and measures and provides the vibration and posture of the vehicle.

Therefore, the control unit 30 may correct the coordinate of the HUD 40 for a coordinate change by the posture of the vehicle, which is measured by the vehicle posture measuring unit 20.

That is, as illustrated in FIG. 2, an HUD coordinate system indicating the coordinate of the HUD 40, a camera coordinate system indicating the coordinate of the surrounding information measuring unit 10, and a posture sensor coordinate system indicating the coordinate of the vehicle posture measuring unit 20 are different from one another, based on the world coordinate system. The control unit 30 integrates the coordinate systems such that an object can be displayed at the same position.

The control unit 30 converts the position of the object sensed by the surrounding information measuring unit 10, such that a view angle measured by the surrounding information measuring unit 10 coincides with the view angle of an image displayed through the HUD 40.

That is, when the view angle at which the surrounding information measuring unit 10 looks forward to sense a forward object according to the installation position thereof is different from the view angle of the image displayed through the HUD 40, the size of the object on the screen is different from the size of the actual object. Therefore, when the objects are simply matched and displayed, the positions and sizes of the objects are changed, and the actual object appears to be different from the object in the image.

Thus, the control unit 30 converts the position and size of the object sensed by the surrounding information measuring unit 10, such that the view angle measured by the surrounding information measuring unit 10 coincides with the view angle of the image displayed through the HUD 40. Then, the control unit 30 extracts a region displayed through the HUD 40 and matches the extracted region on the HUD 40, such that the position of the actual object and the position of the object in the image are matched and displayed.

For example, the control unit 30 converts the image coordinate of the camera into the coordinate of the HUD 40 through a viewpoint conversion matrix expressed as Equation 1, in order to match the view angle of an image A taken through the camera of the surrounding information measuring unit 10 with the view angle of an image B displayed through the HUD 40 as illustrated in FIGS. 3A and 3B.

$$\begin{bmatrix} h_{11} & h_{12} & h_{13} \\ h_{21} & h_{22} & h_{23} \\ h_{31} & h_{32} & h_{33} \end{bmatrix} \qquad \text{[Equation 1]}$$

The view point conversion matrix is differently defined depending on the view angle of the camera surrounding angle and the view angle of the HUD. That is, as the viewpoint conversion matrix is defined depending on the view angles, the viewpoints can be matched with each other through mutual coordinate conversion.

$$w \begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x \\ y \\ 1 \end{bmatrix}, w: \text{constant} \qquad \text{[Equation 2]}$$

Therefore, the control unit 30 may convert the image coordinate (x,y) of the camera into the coordinate (x',y') of the HUD 40 through the viewpoint conversion matrix as expressed as Equation 2, in order to match the coordinates with each other. Then, when a region C displayed through the HUD 40 is extracted and displayed, the positions of the actual object and the object in the image are matched and displayed.

As described above, the coordinate matching apparatus for HUD in accordance with the embodiment of the present invention can not only match the coordinate of the surrounding information measuring unit with the coordinate of the HUD, but also convert the position of the object such that the view angles are matched, in order to display information measured by the surrounding information measuring unit. Thus, the coordinate matching apparatus can match the positions and sizes of the actual object and the object in the image, thereby removing a sense of difference.

Figure 4:
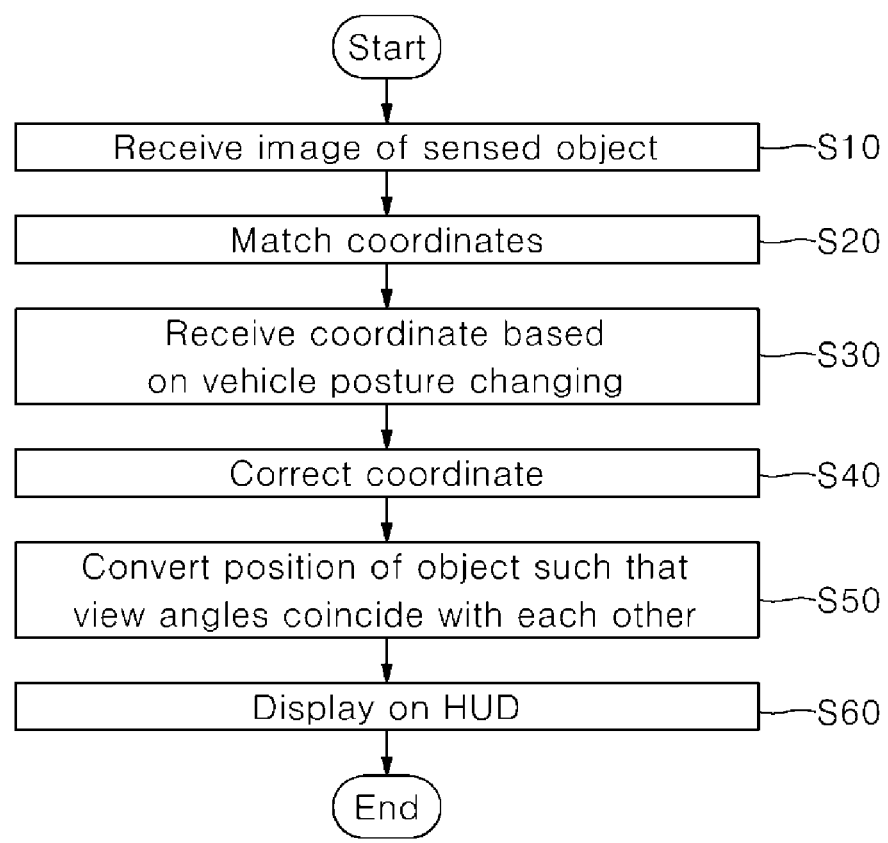
FIG. 4 is a flowchart illustrating a coordinate matching method for HUD in accordance with an embodiment of the present invention.

FIG. 4 is a flowchart illustrating a coordinate matching method for HUD in accordance with an embodiment of the present invention.

As illustrated in FIG. 4, the coordinate matching method for HUD is stated with step S10 at which the control unit 30 receives an image of an object sensed by the surrounding information measuring unit 10.

The surrounding information measuring unit 10 may include one or more of a camera, radar and LiDAR.

The surrounding information measuring unit 10 may be installed at various positions of the vehicle, in order to sense an object by taking an image of the front of the vehicle. Thus, when a coordinate measured by the surrounding information measuring unit 10 does not coincide with the coordinate of the HUD while the position of the object sensed by the surrounding information measuring unit 10 is displayed on the HUD 40, the positions and sizes of the object and the actual object appear to be distorted.

After receiving the image of the sensed object at step S10, the control unit 30 matches the coordinate of the surrounding information measuring unit 10 based on the installation position thereof with the coordinate of the HUD 40, at step S20.

For example, a camera serving as the surrounding information measuring unit 10 may be installed at the front bottom of the vehicle so as to sense a forward object. In this case, since the HUD 40 displays an image on the windshield from the center of the vehicle, even the position of the same object may differ when seen from the respective coordinate systems. Thus, the control unit 30 matches the coordinates with each other such that the corresponding object can be displayed at the same coordinate.

After the coordinate of the HUD 40 is matched at step S20, the control unit 30 receives a coordinate change based on the posture of the vehicle from the vehicle posture measuring unit 20, at step S30.

Thus, when the coordinate change based on the posture of the vehicle occurs, the control unit 30 corrects the coordinate of the HUD 40 at step S40. At this time, the vehicle posture measuring unit 20 may include one or more of a vibration sensor, acceleration sensor and gyro sensor.

As illustrated in FIG. 2, the HUD coordinate system indicating the coordinate of the HUD 40, the camera coordinate system indicating the coordinate of the surrounding information measuring unit 10, and the posture sensor coordinate system indicating the coordinate of the vehicle posture measuring unit 20 are different from one another, based on the world coordinate system. The control unit 30 integrates the coordinate systems such that an object can be displayed at the same position.

After the coordinates are matched with each other through step S40, the control unit 30 converts the position of the object sensed by the surrounding information measuring unit 10 such that a view angle measured by the surrounding information measuring unit 10 coincides with the view angle of an image displayed through the HUD 40, at step S50.

That is, when the view angle at which the surrounding information measuring unit 10 looks forward to sense a forward object according to the installation position thereof is different from the view angle of the image displayed through the HUD 40, the size of the object on the screen is different from the size of the actual object. Therefore, when the objects are simply matched and displayed, the positions and sizes of the objects are changed, and the actual object appears to be different from the object in the image.

Thus, the control unit 30 converts the image coordinate of the camera into the coordinate of the HUD 40 through a viewpoint conversion matrix expressed as Equation 3, in order to match the view angle of an image A taken through the camera of the surrounding information measuring unit 10 with the view angle of an image B displayed through the HUD 40 as illustrated in FIGS. 3A and 3B

$$\begin{bmatrix} h_{11} & h_{12} & h_{13} \\ h_{21} & h_{22} & h_{23} \\ h_{31} & h_{32} & h_{33} \end{bmatrix} \qquad \text{[Equation 3]}$$

The view point conversion matrix is differently defined depending on the view angle of the camera and the view angle of the HUD. That is, as the viewpoint conversion matrix is defined depending on the view angles, the viewpoints can be matched with each other through mutual coordinate conversion.

At step S50, the control unit 30 converts the position of the object sensed by the surrounding information measuring unit 10, through a viewpoint conversion matrix expressed as Equation 4, such that the view angle measured by the surrounding information measuring unit 10 coincides with the view angle of the image displayed through the HUD 40. Then, when a region C displayed through the HUD 40 is extracted and displayed, the position of the actual object and the position of the object in the image are matched and displayed.

$$w \begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x \\ y \\ 1 \end{bmatrix}, w: \text{constant} \qquad \text{[Equation 4]}$$

That is, the control unit 30 may convert the image coordinate (x,y) of the camera into the coordinate (x',y') of the HUD 40 through the viewpoint conversion matrix, in order to match the coordinates with each other.

As described above, the coordinate matching method for HUD in accordance with the embodiment of the present invention can not only match the coordinate of the surrounding information measuring unit with the coordinate of the HUD, but also convert the position of the object such that the view angles are matched, in order to display information measured by the surrounding information measuring unit. Thus, the coordinate matching method can match the positions and sizes of the actual object and the object in the image, thereby removing a sense of difference.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A coordinate matching apparatus for Head-Up Display (HUD), comprising:
    an HUD configured to display an image on the windshield of a vehicle;
    at least one of a camera, radar and LiDAR (Light Detection And Ranging) installed on the vehicle and configured to sense an object in front of the vehicle; and
    a control unit configured to match a coordinate of the at least one of a camera, radar and LiDAR corresponding to an installation position with a coordinate of the HUD based on a viewpoint conversion matrix which is defined depending on a view angle measured by the at least one of a camera, radar and LiDAR and a view angle of the HUD, and display the image by matching a position of the object sensed by the at least one of a camera, radar and LiDAR with the coordinate of the HUD.

2. The coordinate matching apparatus of claim 1, further comprising at least one of a vibration sensor, acceleration sensor and gyro sensor configured to measure vibration and posture of the vehicle,
    wherein the control unit corrects the coordinate of the HUD for a coordinate change based on the posture of the vehicle.

3. The coordinate matching apparatus of claim 1, wherein the control unit converts the position of the object sensed by the least one of a camera, radar and LiDAR such that the view angle measured by the at least one of a camera, radar and LiDAR coincides with the view angle of the HUD.

4. A coordinate matching method for a Head-Up Display (HUD), comprising:
    receiving, by a control unit, an image of an object sensed by at least one of a camera, radar and LiDAR;
    matching, by the control unit, a coordinate of the at least one of a camera, radar and LiDAR corresponding to an installation position with a coordinate of the HUD based on a viewpoint conversion matrix which is defined depending on a view angle measured by the at least one of a camera, radar and LiDAR and a view angle of the HUD, and
    displaying a HUD image by matching a position of the object with the coordinate of the HUD.

5. The coordinate matching method of claim 4, wherein the matching of the coordinate of the at least one of a camera, radar and LiDAR with the coordinate of the HUD comprises correcting the coordinate of the HUD when a coordinate change corresponding to a vehicle posture is received from at least one of a vibration sensor, acceleration sensor and gyro sensor.

6. The coordinate matching method of claim 4, further comprising converting the position of the object sensed by the at least one of a camera, radar and LiDAR such that the view angle measured by the at least one of a camera, radar and LiDAR coincides with the view angle of the HUD.

* * * * *